(12) United States Patent
Dougherty et al.

(10) Patent No.: US 7,360,004 B2
(45) Date of Patent: *Apr. 15, 2008

(54) POWERING A NOTEBOOK ACROSS A USB INTERFACE

(75) Inventors: Michael J. Dougherty, Houston, TX (US); Kenneth W. Stufflebeam, Houston, TX (US); Rahul V. Lakdawala, Cypress, TX (US); Thomas P. Sawyers, Hempstead, TX (US)

(73) Assignee: Hewlett-Packard Development Company, LP., Houston, TX (US)

( * ) Notice: Subject to any disclaimer, the term of this patent is extended or adjusted under 35 U.S.C. 154(b) by 470 days.

This patent is subject to a terminal disclaimer.

(21) Appl. No.: 10/674,923

(22) Filed: Sep. 30, 2003

(65) Prior Publication Data

US 2004/0064621 A1    Apr. 1, 2004

Related U.S. Application Data

(63) Continuation of application No. 09/608,082, filed on Jun. 30, 2000, now Pat. No. 6,668,296.

(51) Int. Cl.
*G06F 13/00* (2006.01)
*G06F 13/14* (2006.01)
*G06F 1/26* (2006.01)

(52) U.S. Cl. .................. 710/303; 710/305; 713/300
(58) Field of Classification Search .............. 710/303, 710/16; 713/300, 340
See application file for complete search history.

(56) References Cited

U.S. PATENT DOCUMENTS 5,265,238 A    11/1993   Canova et al.
5,675,813 A    10/1997   Holmdahl
5,841,424 A    11/1998   Kikinis
5,884,049 A *  3/1999    Atkinson ............... 710/303
5,884,086 A *  3/1999    Amoni et al. .......... 713/300
6,009,363 A * 12/1999    Beckert et al. ........ 701/33
6,011,486 A *  1/2000    Casey .................. 340/7.29
6,044,422 A    3/2000    Tran
6,046,571 A    4/2000    Bovio et al.
6,094,700 A    7/2000    Deschepper et al.
6,105,097 A    8/2000    Larky et al.
6,119,237 A *  9/2000    Cho .................... 713/300
6,178,514 B1*  1/2001    Wood ................... 713/300
6,184,652 B1*  2/2001    Yang ................... 320/110
6,211,649 B1   4/2001    Matsuda
6,281,784 B1*  8/2001    Redgate et al. ....... 340/310.01
6,283,789 B1   9/2001    Tsai
6,308,215 B1  10/2001    Kolbet et al.

(Continued)

OTHER PUBLICATIONS

Universal Serial Bus Specification, Revision 2.0- Apr. 27, 2000- Section 7.2.1.*

*Primary Examiner*—Rehana Perveen
*Assistant Examiner*—Jeremy S. Cerullo

(57) ABSTRACT

A laptop computer and mating docking station where the docking station provides power to the laptop computer over power rails of the Universal Serial Bus (USB) interface. The laptop computer has laptop docking logic that both provides power in accordance with standard USB protocol, and also receiving power across the power rails of the USB interface. Likewise, the docking station has a docking station dock logic that establishes communication with the laptop docking logic across the USB power rails. Once positive communication is established, the dock station provides voltages on the USB power rails sufficient to power the laptop computer as well as charge the laptop's battery.

15 Claims, 3 Drawing Sheets

U.S. PATENT DOCUMENTS 6,357,011 B2    3/2002   Gilbert
6,362,610 B1    3/2002   Yang
6,530,026 B1 *  3/2003   Bard ........................ 713/320
6,633,932 B1 * 10/2003   Bork et al. ................. 710/72
6,668,296 B1 * 12/2003   Dougherty et al. ......... 710/303
6,886,104 B1 *  4/2005   McClurg et al. ............ 713/300
2001/0034250 A1 10/2001  Chadha

* cited by examiner

POWERING A NOTEBOOK ACROSS A USB INTERFACE

CROSS-REFERENCE TO RELATED APPLICATIONS

This application is a continuation of U.S. application Ser. No. 09/608,082, filed Jun. 30, 2000 now U.S. Pat. No. 6,668,296, and entitled "Powering A Notebook Across A USB Interface."

STATEMENT REGARDING FEDERALLY SPONSORED RESEARCH OR DEVELOPMENT

Not applicable.

BACKGROUND OF THE INVENTION

1. Field of the Invention

The present invention relates generally to docking a laptop computer to a docking station. More particularly, the invention relates to powering the laptop through the docking station when the laptop is in the docked position. More particularly still, the invention relates to powering the laptop across a USB interface when in the docked position.

2. Background of the Invention

Computer systems come in many shapes, sizes and computational ability. For persons who work in designated locations, a standard desktop computer may be sufficient to fulfill that person's needs. However, for a user who travels frequently and needs computing power in those travels, a portable or laptop computer is desirable.

Laptop computers are characterized in that the entire computing functionality is incorporated into a single package. That is, the motherboard, hard drive, disk drives, CD ROM drives, keyboard and display are all packaged in a compact device typically weighing less than ten pounds. Laptop computers are fully functional in that they may execute the very same programs, for example word processors and spreadsheet programs, as full sized or desktop computers. Laptop computers have a battery that allows for remote operation of the laptop even in locations where alternating current (AC) wall socket power is not available.

While laptop computers may address portable computing needs, they are not without their limitations. For example, the keyboards of most laptop computers are a non-standard size. That is, the keys may be slightly closer together and not as ergonomically placed as a standard keyboard. Further, standard keyboards typically have function keys, cursor control keys and a full numerical keypad. In laptop computers these keys are incorporated onto the standard keys by means of shift and function control. A further limitation of laptops, given the relatively small size, is they only have a limited number of communication ports available. That is, a laptop may support only a single parallel port, a single serial port and a single Universal Serial Bus (USB) port. Also, the display devices for laptop computers are typically small, as compared to desktop monitors, to keep the overall size of the laptop computer small.

Many laptop users address limitations of laptops by some form of docking station. When the user returns to the home or office, the laptop is "docked" with a non-portable unit. Docking in this manner may expand the capabilities of the laptop computer to include a full size keyboard, a full size monitor, more serial ports, and other functionality typically associated only with desktop computing devices.

The docking station can take many forms. For example, the docking station may extend one of the expansion buses within the laptop computer, e.g. a peripheral components interconnect (PCI) bus, to the docking station such that full computing functionality may be housed within the docking station. Expanding the PCI bus gives the docking station the ability to include a hard drive, expansion cards and the like. For laptop computers that dock to this type of docking station, the docking station typically provides power to the laptop within the docking connector between the laptop and the docking station.

A second type of docking station, while extending the laptop's capabilities, it is not as extensive as the dock station that extends one of the expansion buses of the laptop. This second type docking station is commonly referred to as a port replication docking station. By port replication it is meant that by plugging the laptop into the docking station, more serial and parallel ports are available for connection to printers, scanners, full size display devices, serial or parallel pointing devices and the like. As with the full docking station explained above, these port replication docks typically also include power connections in the docking connector.

Another method of expanding the capabilities of a laptop may be a form of port replication across a USB port. A user connects a laptop, via a USB connection, to a port replication device which generates plurality of communication ports for use as described above. However, in situations where port replication is accomplished across the USB connector, the laptop user also plugs the laptop into a separate source of power, or operates the laptop on battery power. Given that the user most likely intends to use the laptop for an extended period of time in the location where port replication is desirable, a user of the such a system plugs the AC/DC power converter (also known as a power "brick") into a standard AC wall socket on its input and its output into the laptop computer. Thus, in this situation the user is required to plug in at least the USB expansion connection as well as a power cable. Also, there are prior art devices that have the appearance of a full docking station, that is the laptop may physically couple to a non-portable docking station where the act of docking couples the USB ports; however, these devices still require the user to separately apply power to the laptop.

Thus, it would be desirable to have a USB based docking station that has the capability of both operating the laptop computer and charging the batteries in the laptop computer while docked without the need to plug in a separate power connection, thus reducing the time and complexity to couple the laptop to the docking unit. Despite the desirability of such systems, none are available in the prior art.

BRIEF SUMMARY OF THE INVENTION

The problems noted above are solved in large part by a laptop computer and related docking station adapted to supply power from the docking station to the laptop computer across the USB connection. To accomplish this, the laptop computer is modified to have circuitry which is capable of being detected across USB power rails by the docking station and also capable of turning off the five volts typical supplied by the laptop onto the USB port, and instead, receiving power at 18.5 volts, from the docking station across the USB connections. The laptop computer may be operated by the dock unit supplied power and, if necessary, the laptop's battery may be charged. Likewise, the docking station contains circuitry coupled to the power rails of the USB port which allows the docking station to detect whether the laptop computer coupled to the docking station is capable of receiving power.

Thus, a laptop user need only plug the laptop into the docking station via the USB port, even if the battery for the laptop computer is drained. Once physically coupled to the docking station, the docking station detects whether or not the attached laptop is capable of receiving power across the USB port. If so, the docking station ramps power to the laptop computer to facilitate its operation.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
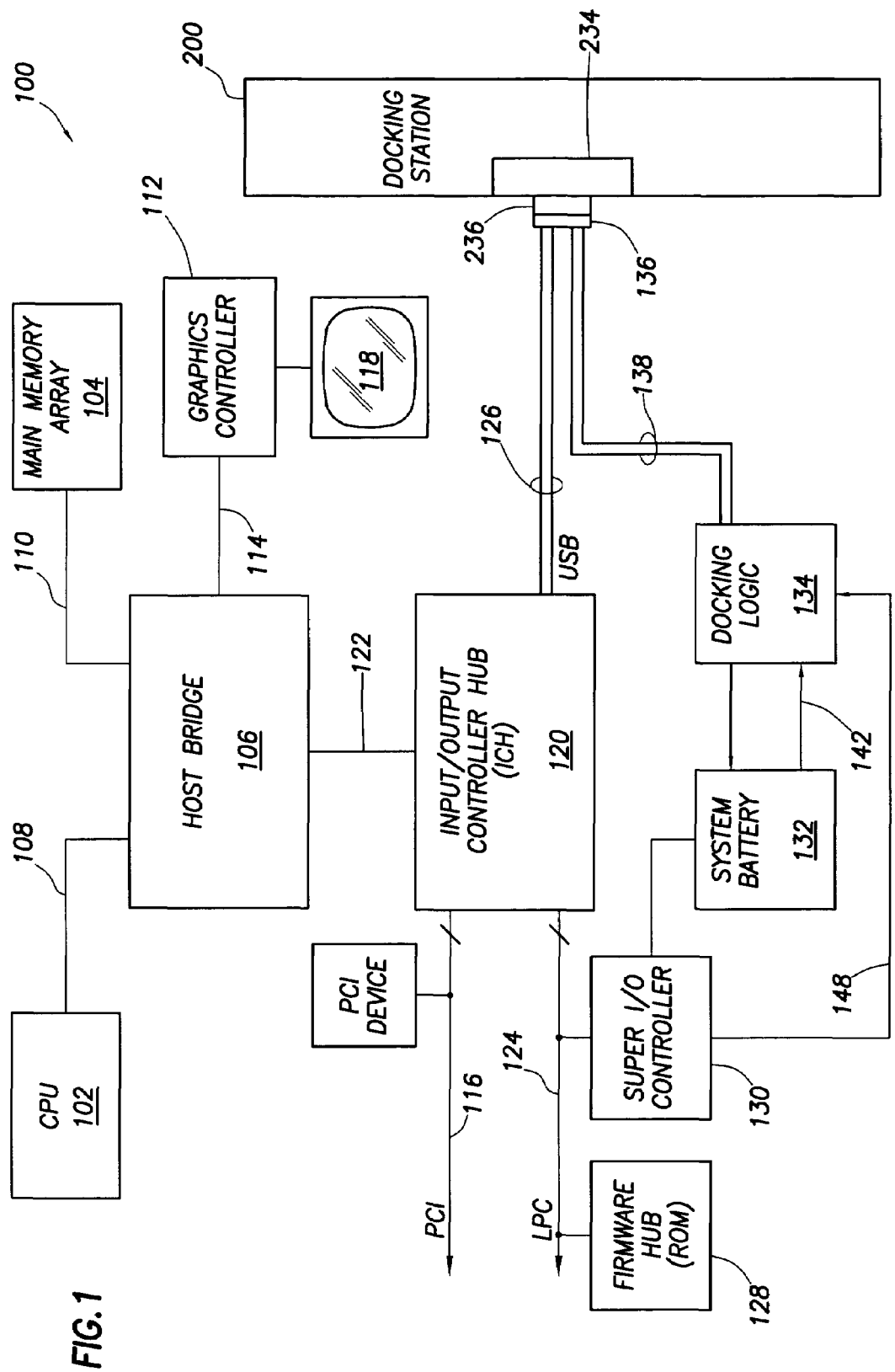
FIG. 1 shows an exemplary computer system of the preferred embodiment.
Figure 2:
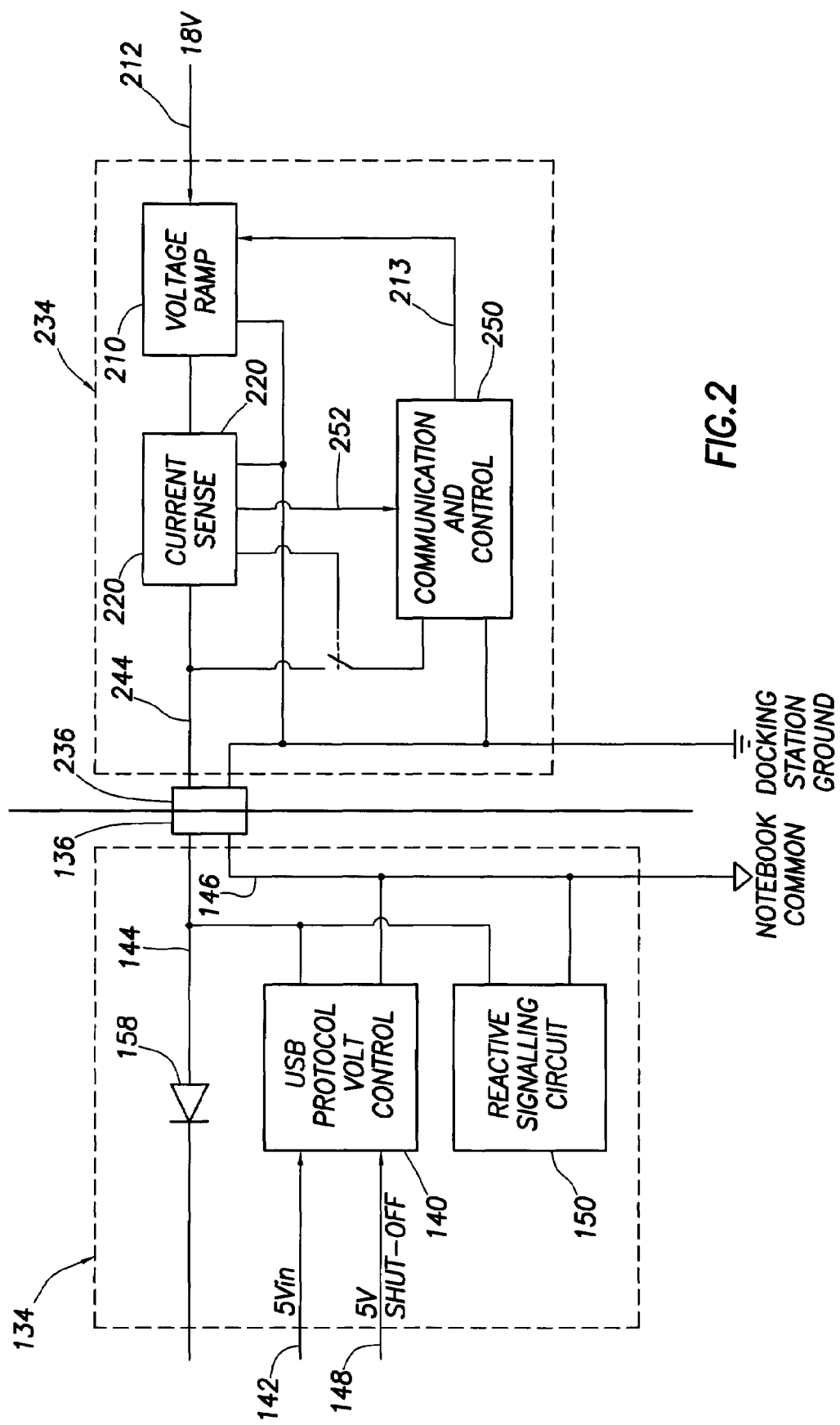
FIG. 2 shows a partial block diagram electrical schematic of a docked laptop and docking station.
Figure 3:
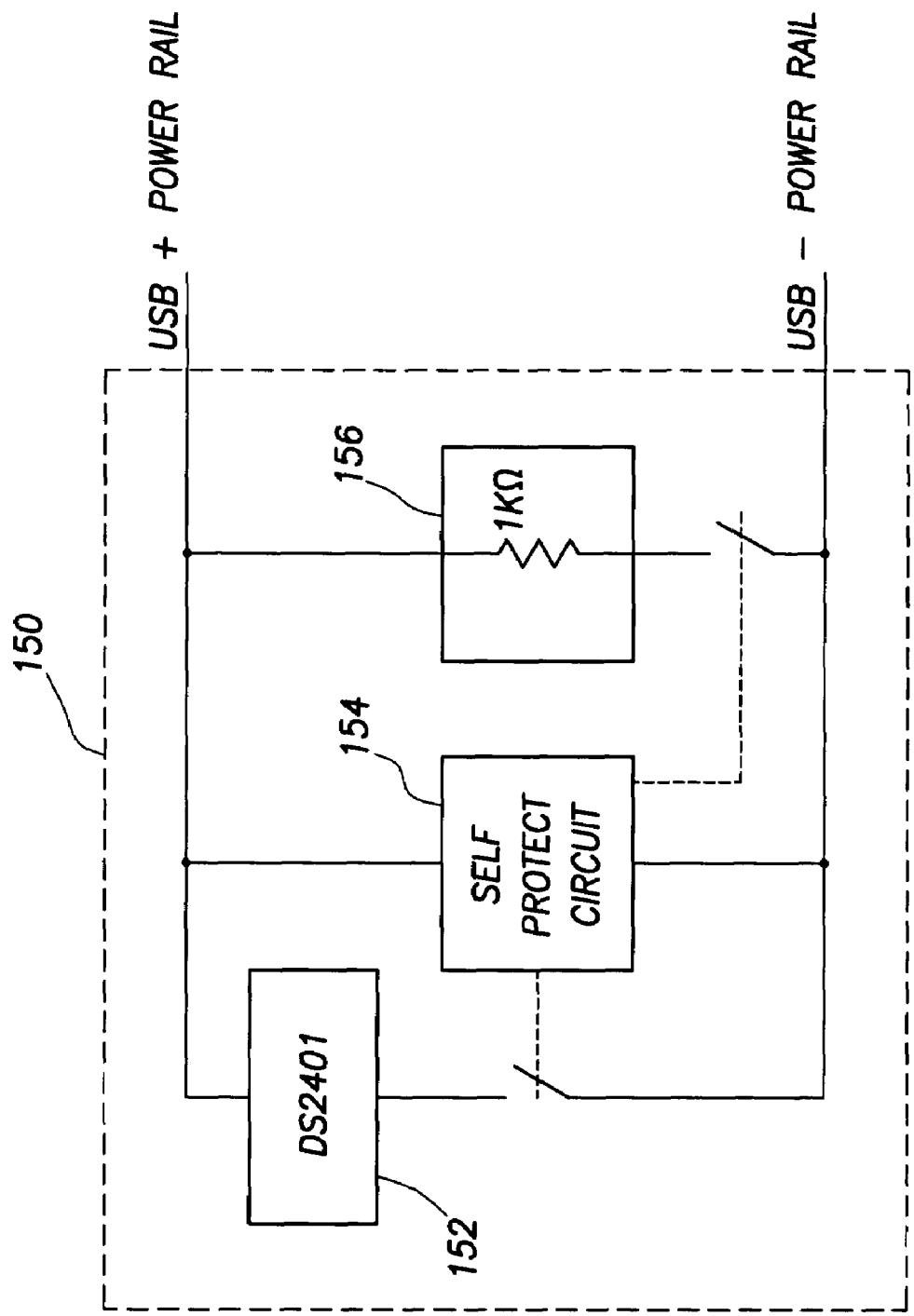
FIG. 3 shows a more detailed electrical schematic of the reactive signaling circuit of the preferred embodiment.

The preferred embodiment of this invention, as illustrated in FIGS. 1–3, comprises a laptop computer 100 and an associated docking station 200. The computer system 100 may be coupled to the docking station 200 and thus be in a "docked" configuration. Likewise, the computer system 100 may be de-coupled from a docking station 200 and therefore be in an "undocked" configuration.

FIG. 1 illustrates a laptop computer 100 in accordance with a preferred embodiment of the invention. Laptop computer 100 generally includes a processor or CPU 102 coupled to a main memory array 104 and a variety of other peripheral computer system components through an integrated Host bridge logic device 106. The CPU 102 preferably couples to bridge logic 106 via a CPU bus 108, or the bridge logic 106 may be integrated into the CPU 102. The CPU 102 may comprise, for example, a Pentium® III microprocessor. It should be understood, however, that computer system 100 could include other alternative types of microprocessors. Further, an embodiment of computer system 100 may include multiple processors, with each processor coupled through the CPU bus 108 to the bridge logic unit 106.

The main memory array 104 preferably couples to the bridge logic unit 106 through a memory bus 110, and the bridge logic 106 preferably includes a memory control unit (not shown) that controls transactions to the main memory 104 by asserting the necessary control signals during memory accesses. The main memory 104 functions as the working memory for the CPU 102 and generally includes a conventional memory device or array of memory devices in which program instructions and data are stored. The main memory array may comprise any suitable type of memory such as dynamic random access memory (DRAM) or any of the various types of DRAM devices such as synchronous DRAM (SDRAM), extended data output DRAM (EDO DRAM), or Rambus™ DRAM (RDRAM).

The laptop computer 100 also preferably includes a graphics controller 112 that couples to the bridge logic 106 via an expansion bus 114. As shown in FIG. 1, the expansion bus 114 preferably comprises an Advanced Graphics Port (AGP) bus. Alternatively, the graphics controller 112 may couple to bridge logic 106 through a Peripheral Component Interconnect (PCI) bus 116. As one skilled in the art understands, the graphics controller 112 controls the rendering of text and images on a display device 118. The graphics controller 112 may embody a typical graphics accelerator generally known in the art to render three-dimensional data structures on display 118. These data structures can be effectively shifted into and out of main memory 104 via bridge logic 106. The graphics controller 112 therefore may be a master of the expansion bus (either PCI or AGP bus) enabling the graphics controller 112 to request and receive access to a target interface within the bridge logic unit 106, including the memory control unit. This mastership capability permits the graphics controller 112 to access main memory 104 without the assistance of the CPU 102. A dedicated graphics bus accommodates rapid retrieval of data from main memory 104. As will be apparent to one skilled in the art, the bridge logic 106 includes an AGP interface (not specifically shown) to permit master cycles to be transmitted and received by bridge logic 106. The display 118 comprises any suitable electronic display device upon which an image or text can be represented. A suitable display device may include, for example, a liquid crystal display (LCD), a thin film transistor (TFT), a virtual retinal display (VRD), or any other type of suitable display device for a laptop computer system.

The laptop computer system 100 preferably comprises another bridge logic device 120 that bridges the primary expansion bus 122 to various secondary buses including a low pin count ("LPC") bus 124 and the PCI bus 116. In accordance with the preferred embodiment, the bridge device 120 is an Input/Output Controller Hub ("ICH"). The ICH 120 supports the LPC bus 124, the PCI bus 116, the USB bus 126 as well as various other secondary buses, either directly or by way of further bus bridges.

In the preferred embodiment of FIG. 1, the primary expansion bus 122 comprises a Hub-link bus which is a proprietary bus of the Intel® Corporation. However, laptop computer system 100 is not limited to any particular type of primary expansion bus 122, and thus other suitable buses may be used.

The preferred embodiment of laptop computer 100 also has docking logic 134. Docking logic 134 is a set of circuitry coupled to the USB port 136 power lines 138. More specifically, the standard USB communication cable has four conductors. Two of these conductors are serial communication conductors 126 which allow communication between devices using USB protocol. The other two conductors carry power between USB devices. Under USB protocol, the power conductors 138 carry five volts. Referring to FIG. 1, the laptop computer 100 of the preferred embodiment does not modify operation of the serial communication conductors 126 of the USB protocol. Preferably, all communications to establish whether laptop computer 100 is capable of receiving power from the docking station 200 take place over the power conductors or power rails 138 of the USB cable connector.

FIG. 2 shows in more detail the docking logic 134 of the laptop computer 100 coupled to docking logic 234 of the docking station 200. Docking of these two logic circuits is preferably through USB connector 136 of the laptop computer 100 and a mating USB connector 236 of the docking station 200.

Under standard USB protocol, the laptop computer 100 provides power to USB devices downstream of the laptop computer 100. Thus, in normal operation, the USB protocol voltage control unit 140 receives a five volt input signal 142 which it couples to the positive power rail 144 of the power conductors 138. Downstream USB devices may draw current through the positive power rail 144. If a user of the laptop computer 100 plugs in, for example, a USB mouse into the USB connector 136, that mouse under USB protocol may draw power across the power conductors 138 for its operational use.

Assume for purposes of explanation that laptop computer 100 has a charged battery and is in an operational state. In such a condition, the laptop computer 100 preferably provides five volt power across the power conductors 138. Further assume that the user docks the laptop 100 with a docking station 200 of the preferred embodiment. In so doing, the user either physically plugs in a USB cable to the connector 136 or slides the laptop computer 100 into a docking station 200. In this instance, with the laptop computer 100 on and fully functional, the laptop computer 100 attempts to provide power across the USB cable to the docking station 200.

Under normal USB protocol, coupling of USB devices requires a series of USB handshaking protocols to identify both the host or master device, which would be the laptop computer 100, and any downstream device, which in this exemplary case is the docking station 200. In the preferred embodiment of this invention, this handshaking protocol between the laptop computer 100 and the docking station 200 reveals to software running in the laptop computer 100 that the docking station 200 is capable of providing power across the power rails 138 of the USB interface. It will be understood that this handshaking protocol between the laptop computer 100 and the docking station 200 occurs over the serial communication lines 126, and these lines are not shown in FIG. 2.

Based on the handshaking between the two devices, operating system software loads a driver specifically used with the docking station 200. Though this driver may provide many functions, the function of concern is that the driver preferably turns off the laptop computer's ability to provide five volts to the power rails 138. More specifically, the driver loaded by the operating system of the laptop computer 100 preferably commands the Super I/O controller 130 to issue a five volt shut-off command signal 148, preferably through one of its digital outputs. This five volt shut-off command couples to the USB protocol voltage control unit 140 of the docking logic 134. Upon receiving this five volt shut-off command signal 148, the USB protocol voltage control unit 140 preferably de-couples the five volt input line 142 from the positive power rail 144. Thus, the laptop computer 100 breaks with standard USB protocol and the power rails 138 are no longer capable of providing power to downstream devices.

As far as docking logic 234 of the docking station 200 is concerned, the situation where laptop computer 100 turns off the five volt supply presents itself in the same manner as coupling a laptop computer 100 that either does not have a battery, and therefore is not operational, or whose battery is completely discharged. Thus, the following description is equally applicable to both situations. It is possible that laptop computers that do not have the capability of receiving power across the USB port may be docked with docking station 200. Therefore, docking station dock logic 234 must establish that the laptop computer to which it is docked is capable of receiving power. Preferably this is done by attempting to establish communications across the power rails 138 of the USB connector.

Initially voltage ramp logic 210 (FIG. 2) provides no voltage whatsoever to the positive power rail 244 on the docking station 200 side of the connection. Upon detecting no voltage on the USB power rails, communication and control logic 250 commands the voltage ramp logic 210 to ramp-up a small voltage, preferably 3.1 volts, onto power rail 244. Positive power rail 244 couples to the power rail 144 on the laptop side of the connection and therefore also couples to the reactive signaling circuit 150. Communication and control circuit 250 couples to reactive signaling circuit 150 across these power rails. In broad terms, the communication and control circuit 250 of the docking logic 234 attempts to establish communication with the reactive signaling circuit 150 of the laptop docking logic 134. If communication and control circuit 250 establishes positive communication with reactive signaling circuit 150, the docking station 200 has made a positive identification that the laptop to which it is docked is capable of receiving power across the USB connection.

More specifically, communication and control circuit 250 preferably communicates with reactive signaling circuit 150 by serially communicating across the positive power rail 144. While there may be many protocols and devices capable of this communication, the preferred embodiment of the reactive signaling circuit 150 comprises a Dallas Semiconductor device part number DS2401, as shown in FIG. 3. This DS2401 has the characteristic that it stores charge drawn from its signaling line, and then, in response to a specific pattern of high and low voltages on its signaling line, transmits a series of high and low pulses across the signaling line to uniquely identify the device. Preferably, the communication and control logic 250 performs the necessary steps to initiate communication with the DS2401 device and receives any return communication issued thereby.

Upon receiving the communication from the DS2401 of the reactive signaling circuit 150, the communication and control circuit 250 preferably performs checks on the information received to verify whether the laptop to which it is docked is capable of receiving power across the USB connection. Dallas Semiconductor makes another device, a DS2480, which is specifically made to communicate with the DS2401. However, in the preferred embodiment this device is not used and instead a Programmable Array Logic ("PAL") is used. A PAL has the characteristic that it may be field programmed to execute certain steps or states and is therefore considered a field programmable state machine. The PAL of the preferred embodiment performs all steps necessary to communicate with the reactive signaling circuit 150 to establish positive identification that the laptop to which the docking station 200 is docked is capable of receiving power across its USB connector.

The communication and control logic 250, after positively identifying the laptop as capable of receiving power, informs the voltage ramp logic 210 across the ramp signal line 213 to ramp the voltage on the positive USB power rail 244, 144 up to approximately 18 volts. Voltage ramp logic 210 couples to an 18 volt supply 212 which preferably comes from a power supply (not specifically shown).

Voltage ramp logic 210, upon receiving the ramp indication from the communication and control logic 250, preferably ramps the voltage to 18 volts over a period of 20–50 milli-seconds. Thus, the voltage on positive power rail 144 with respect to the negative power rail 146 in the laptop computer begins to rise toward 18 volts. Laptop computer 100 preferably operates using the 18 volt power supplied by the docking station 200 across the USB interface. Also, the laptop computer may charge its battery, if needed, with this same supply.

It is possible that laptop computers that are not capable of receiving power across their USB interfaces may be coupled to the docking station 200. Indeed, it may be possible that a user quickly changes or swaps the USB connection from a laptop capable of receiving power to a laptop not capable of receiving power. The docking station 200 preferably detects that a computer user has de-coupled the USB port. Detection must be fast enough to insure that the dock station docking logic 234 removes the 18 volt power supply before the user couples it to another computer. This capability is preferably accomplished by a combination of functionality in the laptop docking logic 134, specifically the reactive signaling circuit 150, and the dock station docking logic 234, specifically current sense logic 220.

Reactive signaling circuit 150 in the laptop computer 100 in combination with current sense logic 220 in the docking station 200 operate to detect that a user has unplugged or de-coupled the laptop computer 100 and the docking station 200. More specifically, after voltage ramp circuit 210 of the docking logic 234 ramps voltage on the positive power rail 244, 144 above a predetermined value, preferably 6 volts, the reactive signaling circuit 150 preferably draws a small amount of current from the docking station 200. This small amount of current, a coupling current, is detected by current sense logic 220 of the dock station docking logic 234. This small coupling current is monitored by the dock station docking logic 234 as an indication that two compatible devices remain coupled together. When the dock station 200 provides power for full operation of the laptop computer 100, as many as 2.5 amps of current may flow from the dock station 200 to the laptop computer 100 across the USB connectors 136, 236. The coupling current is part of that 2.5 amp power flow. That is to say, when the laptop computer 100 is operating from power supplied by the dock station 200, the coupling current may be undistinguishable from the power drawn by the laptop.

As long as current sense logic 220 detects at least an amount of current equal to the coupling current, the dock station docking logic 234 is assured that the laptop computer 100 is capable of receiving power across the USB port. If the laptop computer system user unplugs the USB connection, or de-couples the laptop from the docking station, current sense logic 220 detects the loss of current flow and immediately notifies the communication control logic 250 across logic line 252. Communication and control logic 250 instructs voltage ramp logic 210 to cease providing power to the power rails 138 of the USB interface. Thus, the current sense logic 220, in combination with reactive signal circuit 150, assures a system user cannot dock a laptop that is not capable of receiving power to a powered USB port.

Current sense logic 220 is preferably implemented with a Schottky diode in parallel with a resistor of small resistance. The voltage across this parallel combination is preferably detected by a comparator or operational amplifier whose output quickly saturates as current flow exceeds the coupling current minimum. One of ordinary skill in the art, now understanding the functionality of the current sense logic 220, could implement many circuits to perform this function including the use of precision current sense resistors. Likewise, current logic 156, as indicated in FIG. 3, preferably comprises 1 kΩ resistor coupled across the power rails. However, this 1 kΩ resistance couples across the power rails only as the voltage on those rails reaches and exceeds the threshold voltage of 6 volts. Below the threshold voltage, which includes the voltage that the laptop supplies in conformance with standard USB protocol, the 1 kΩ resistance does not draw current from the positive power rail.

Because powering the laptop computer across the USB interface power rails requires voltages that may exceed breakdown voltages of the signaling device 152, the reactive signaling circuit 150 preferably also comprises a self-protection logic 154 coupled across the positive and negative USB power rails. The self protection circuit 154 electrically floats the signaling device 152 when the supply voltage exceeds the threshold voltage preferably set at 6 volts, but in any case set below the breakdown voltage of device 152.

In operation, a user takes a laptop computer 100 that either does not have battery, or has a discharged battery, and docks it to docking station 200. Dock station docking logic 234 places a small voltage across the power rails 138, preferably 3.1 volts. Communication and control logic 250 attempts to communicate with the reactive signaling circuit 150 serially over the positive USB power rail 144, 244. It will be understood that in the preferred implementation of the reactive signaling circuit 150, the device 152, though being part of a laptop computer that is without power, is capable of serial communication powered by current drawn and stored from the 3.1 volts applied to the power rails by dock logic 234. Once the communication and control logic 250 establishes positive communication with the reactive signaling circuit 150, the voltage ramp logic 210 ramps the voltage on the positive power rails 144, 244 to 18 volts. As the voltage exceeds 6 volts, coupling current logic 156 couples a resistance across the power rails of approximately 1 kΩ, and self protection logic 154 electrically floats signally device 152. Coupling resistance across the power rails results in a current flow to the laptop computer 100 of approximately six milliamps. Current sense logic 220 senses this six milliamp current as a continuing indication that the laptop computer 100 is capable of receiving power across the USB interface. As the voltage approaches 18 volts, the laptop computer preferably draws sufficient current through the USB connector 136, 236, and through the diode 158, or an equivalent circuit thereof, to operate the laptop computer. The term "operate" includes not only running the power supply, but also, if necessary, charging the system battery 132.

It is also possible that an operating laptop, providing five volts on the power rails 138 of the USB interface in conformance with USB protocol, may be coupled to the docking station 200. When this is the case, the communication and control logic 250 senses the five volts supplied by the laptop computer 100 and takes no action to attempt to power the laptop. However, in this powered case, the laptop computer 100 preferably establishes communication across the signal lines 126 of the USB interface to the docking station 200 in conformance with standard USB protocol. In this situation, the laptop establishes that the docking station 200 to which it is coupled is capable of providing power. The laptop computer 100 preferably loads a software driver associated with the laptop computer which preferably notifies the Super I/O controller 130 to issue a five volt shut off command signal 148 to the USB protocol voltage control unit 140 of the docking logic 134. Responsive to this five volt shut off command, the USB protocol voltage control unit 140 turns off the five volt power supplied across the power rails 138. Communication between the laptop computer 100 and the docking station 200 then proceeds as described above with respect to coupling a laptop with a dead battery or no battery to the docking station 200.

The above discussion is meant to be illustrative of the principles and various embodiments of the present invention. Numerous variations and modifications will become apparent to those skilled in the art once the above disclosure is fully appreciated. For example, the preferred embodiment of the present invention is disclosed to modify operation of USB ports to power the laptop from the docking station; however, there may be other communication protocols and buses coupling a laptop and docking station, and powering across these additional buses would be within the contemplation of this invention. For example, 1394 "Fire Wire" buses and DVI bus interfaces. Additionally, any self powered USB device (that is, not getting its operating power from upstream devices) could be modified to provide power and thus would be considered equivalent to powering across the USB by a docking station.

Likewise, there may be many devices or schemes to facilitate the communication between the communication and control logic 250 and the reactive signaling circuit 150. The preferred embodiment of this invention describes having a Dallas semiconductor device DS2401 in the reactive signaling circuit 150 and a PAL for communication and control logic 250. One of ordinary skill in the art, now understanding the functionality and requirements of these two circuits, could devise other communication protocols and schemes to perform these tasks which would be within the contemplation of this invention. It is intended that the following claims be interpreted to embrace all such variations and modifications.

What is claimed is:

1. A computer system, comprising:
   a device; and
   a laptop computer coupled to said device by way of a communication bus operated under a communication protocol, the communication bus comprising communication lines and power lines;
   wherein the device determines if the laptop computer is capable of being powered across the power lines of the communication bus by communication with the laptop across the power lines of said communication bus.

2. The computer system of claim 1 wherein the laptop computer is capable of providing power to external devices across the communication bus when the laptop is not coupled to the device.

3. The computer system as defined in claim 1 wherein the communication bus operates under the Universal Serial Bus (USB) protocol.

4. The computer system as defined in claim 1 wherein the laptop computer is capable of supplying power across power lines of communication bus.

5. The computer system as defined in claim 1 wherein the device further comprises a docking station.

6. In a computer system comprising a laptop computer adapted to dock to a docking station by way of a USB interface, a method of operating said computer system comprising:
   powering said laptop computer from said docking station across said USB interface with a voltage in excess of five volts.

7. The method of claim 6 further comprising powering the laptop computer from the docking station across the USB interface with substantially 18 volts.

8. The method of claim 6 further comprising shutting off power to the communication bus when a laptop computer is detached from the docking station.

9. A docking station for mating with a laptop computer comprising:
   a Universal Serial Bus (USB) interface having data signal lines and power rails that couple to the laptop computer; and
   a docking logic that provides power to said laptop over the power rails of the USB interface at a voltage of greater than five volts.

10. A computer system, comprising:
    a device having power available therein;
    a laptop computer coupled to said device by way of a communication bus that, in a first mode, operates under the Universal Serial Bus (USB) protocol and is capable of supplying power across power lines of communication bus; and
    in a second mode of operation said laptop computer powered by said device across the power lines of said communication bus.

11. The computer system as defined in claim 10 wherein the device further comprises a docking station.

12. A method comprising:
    powering downstream devices by power rails of a bus interface of a laptop computer, the bus interface operated in compliance with the Universal Serial Bus (USB) protocol, and the powering in a first mode of operation; and
    accepting, in a second mode of operation, power by the laptop computer on the power rails of the bus interface.

13. The method as defined in claim 12 further comprising accepting power from a docking station on the power rails of the bus interface.

14. The method as defined in claim 12 further comprising accepting power at a voltage in excess of five volts.

15. The method as defined in claim 14 further comprising accepting power at a voltage level of substantially 18 volts.

* * * * *